United States Patent
Nilsson et al.

(10) Patent No.: US 8,228,386 B2
(45) Date of Patent: Jul. 24, 2012

(54) VIDEO SIGNAL LOSS DETECTION

(75) Inventors: Michael E Nilsson, Ipswich (GB); Rory S Turnbull, Ipswich (GB); Roberto Alvarez Arevalo, Ipswich (GB)

(73) Assignee: British Telecommunications public limited company, London (GB)

( * ) Notice: Subject to any disclaimer, the term of this patent is extended or adjusted under 35 U.S.C. 154(b) by 1228 days.

(21) Appl. No.: 11/916,072

(22) PCT Filed: May 19, 2006

(86) PCT No.: PCT/GB2006/001855
§ 371 (c)(1),
(2), (4) Date: Nov. 30, 2007

(87) PCT Pub. No.: WO2006/129059
PCT Pub. Date: Dec. 7, 2006

(65) Prior Publication Data
US 2008/0198234 A1    Aug. 21, 2008

(30) Foreign Application Priority Data
Jun. 2, 2005    (EP) .................................... 05253395

(51) Int. Cl.
*H04N 17/00* (2006.01)
*H04N 17/02* (2006.01)

(52) U.S. Cl. ........ 348/193; 348/152; 348/155; 348/180; 348/192; 348/701; 702/66; 702/69; 702/71; 375/240.27; 375/240.26

(58) Field of Classification Search .................. 348/152, 348/155, 180, 192, 193, 701; 702/66, 69, 702/71; 375/240.26, 240.27
See application file for complete search history.

(56) References Cited

U.S. PATENT DOCUMENTS
5,576,738 A  *  11/1996  Anwyl et al. ................. 345/212
(Continued)

FOREIGN PATENT DOCUMENTS
CN    1272200 A    11/2000
(Continued)

OTHER PUBLICATIONS
http://www.evertz.com/products/7765AVM-4.php.
(Continued)

*Primary Examiner* — Jason Salce
(74) *Attorney, Agent, or Firm* — Nixon & Vanderhye P.C.

(57) ABSTRACT

Faults resulting in reception of a still, but unknown, frame are recognized by comparing each received frame of the video signal with its predecessor, incrementing a counter in the event that the difference between the frames falls below a threshold; and generating an alarm signal in the event that the count of the counter exceeds a predetermined count. Other types of fault such as loss of signal (i.e. reception of just noise) are recognized by incrementing the counter whenever the difference exceeds a threshold. Similar results may be obtained by instead the monitoring quantization step size and/or number of transmitted bits of a digitally coded signal, and noting that it falls below, or exceeds, a threshold. A preferred option is to compute a complexity measure, being a monotonically increasing function (e.g the product) of the quantization step size and of the number of coded bits and compare this with the threshold value. Faults occasioned by receipt of a particular fixed image instead of the wanted picture are recognized by comparing each frame of the video signal with the fixed image, and generating an alarm signal in the event that the difference between the frames consistently falls below a threshold.

15 Claims, 4 Drawing Sheets

U.S. PATENT DOCUMENTS

| | | | |
|---|---|---|---|
| 6,369,852 B1 | 4/2002 | Honda | |
| 6,898,321 B1 | 5/2005 | Knee et al. | |
| 6,975,777 B1* | 12/2005 | Kenmochi | 382/268 |
| 7,697,635 B2* | 4/2010 | Haslach | 375/317 |
| 7,783,155 B2* | 8/2010 | Lee et al. | 386/343 |
| 2002/0003575 A1* | 1/2002 | Marchese | 348/231 |
| 2002/0105597 A1 | 8/2002 | Janko et al. | |
| 2003/0020677 A1* | 1/2003 | Nakano | 345/87 |
| 2003/0090505 A1* | 5/2003 | McGee et al. | 345/721 |
| 2003/0219070 A1 | 11/2003 | Turaga et al. | |
| 2004/0071353 A1* | 4/2004 | Dijk et al. | 382/236 |
| 2004/0212738 A1* | 10/2004 | Sheraizin et al. | 348/586 |
| 2006/0062307 A1* | 3/2006 | Drezner et al. | 375/240.16 |
| 2007/0101379 A1* | 5/2007 | Pereira | 725/90 |
| 2010/0150471 A1* | 6/2010 | Cobb et al. | 382/274 |

FOREIGN PATENT DOCUMENTS

| | | |
|---|---|---|
| EP | 0 520 250 | 12/1992 |
| EP | 1 001 542 A1 | 5/2000 |
| GB | 2 366 466 | 3/2002 |
| GB | 2 372 892 | 9/2002 |
| JP | 2002-290998 | 11/2002 |
| WO | 01/91473 | 11/2001 |
| WO | 2004/054274 | 6/2004 |

OTHER PUBLICATIONS http:///www.security.globalsources.com/gson/I/CCTV-digital/a/9000000054943.htm.

International Search Report for PCT/GB2006/001855 mailed Aug. 30, 2006.

Translation of Office Action issued Aug. 4, 2010 in corresponding Chinese Application No. 200680018550.X (6 pgs.).

Notice of Decision of Granting Patent Right for Invention issued Dec. 30, 2011 in corresponding Chinese Application No. 200680018550.X with an at least partial English-language translation thereof.

* cited by examiner

VIDEO SIGNAL LOSS DETECTION

This application is the U.S. national phase of International Application No. PCT/GB132006/001855 filed 19 May 2006 which designated the U.S. and claims priority to European Patent Application No. 05253395.7 filed 2 Jun. 2005, the entire contents of each of which are hereby incorporated by reference.

The present invention is concerned with video signal loss detection. It is particularly useful in video streaming, though it is useful in other situations too.

FIG. 1 shows a typical video streaming system. A video encoder 1 receives multimedia content from a content source, such as from a satellite decoder 2. The encoder encodes the live content and sends the encoded representation to a server 3. The server both stores the encoded content for later retrieval, and streams it live over an IP network 4 to individual client terminals 5. In error conditions the audiovisual signal received by the encoder can be lost. This can be due to conditions including a crash of the satellite decoder, and absence of the content from the signal received from the satellite due to problems at the source of the content. To ensure continuity of content delivery, such error conditions need to be detected and overcome. Once the error condition has been detected, the best solution depends on the exact type of error condition, but may include resetting or re-booting the satellite decoder and switching to a different content source, either to the same content from another distribution network, or to another piece of content from the same or a different distribution network.

Video signal loss detection is widely used in the security and surveillance industry, for examples see http://www-.evertz.com/products/7765AVM-4.php and http://www.security.globalsources.com/gsol/l/CCTV-digital/a/9000000054943.htm. Here the aim is to detect broken cameras and lost physical connections. This is believed to be done by consideration of the analogue signal received from the camera, and particularly looking for the absence of video synchronisation markers in the analogue signal.

These approaches however suffer from the disadvantage that they fail to detect an error in (or absence of) picture content which is of such a nature that the analogue signal waveform continues to meet the relevant standards specification.

Aspects of the present invention are set out in the claims.

BREIF DESCRIPTION OF THE DRAWINGS

Some embodiments of the invention will now be described, by way of example with reference to the accompanying drawings in which.

DETAILED DESCRIPTION OF PRESENT EXAMPLE EMBODIMENTS

Figure 1:
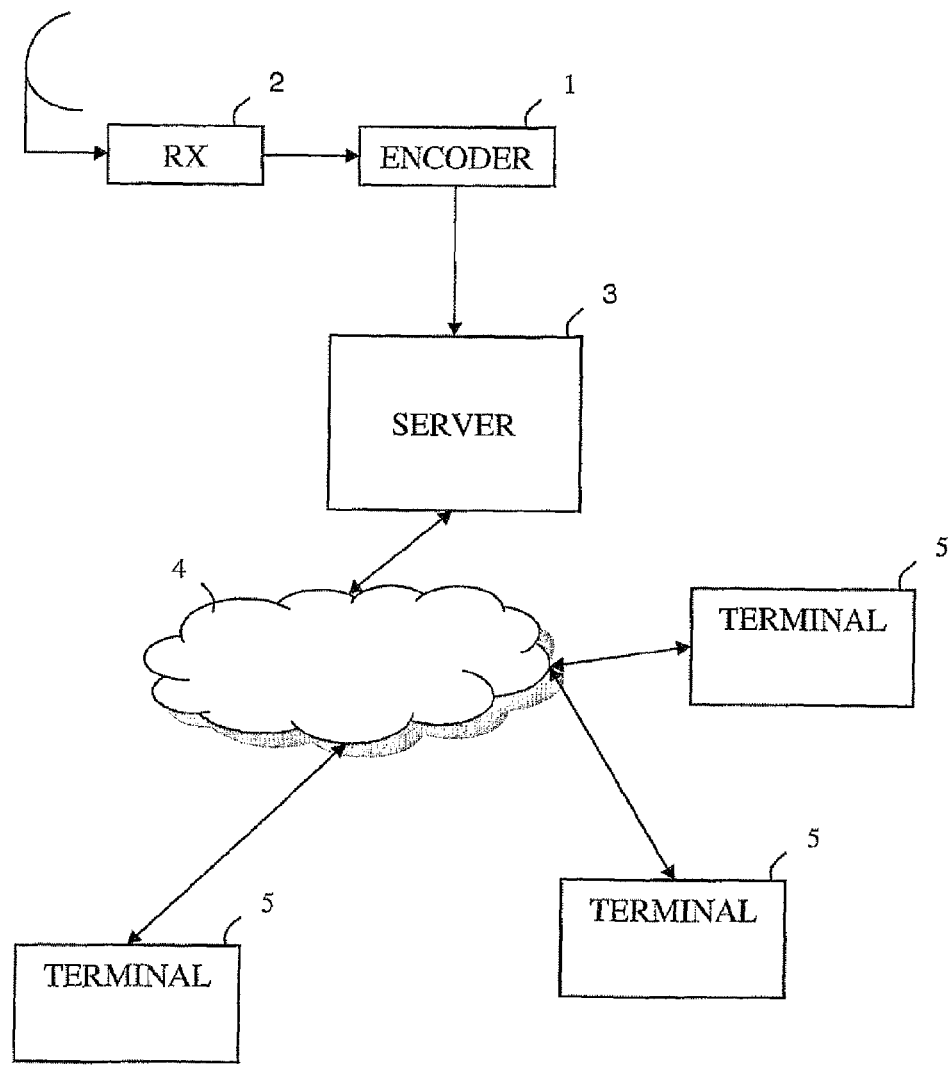
FIG. 1 is diagram showing a typical video streaming system.
Figure 2:
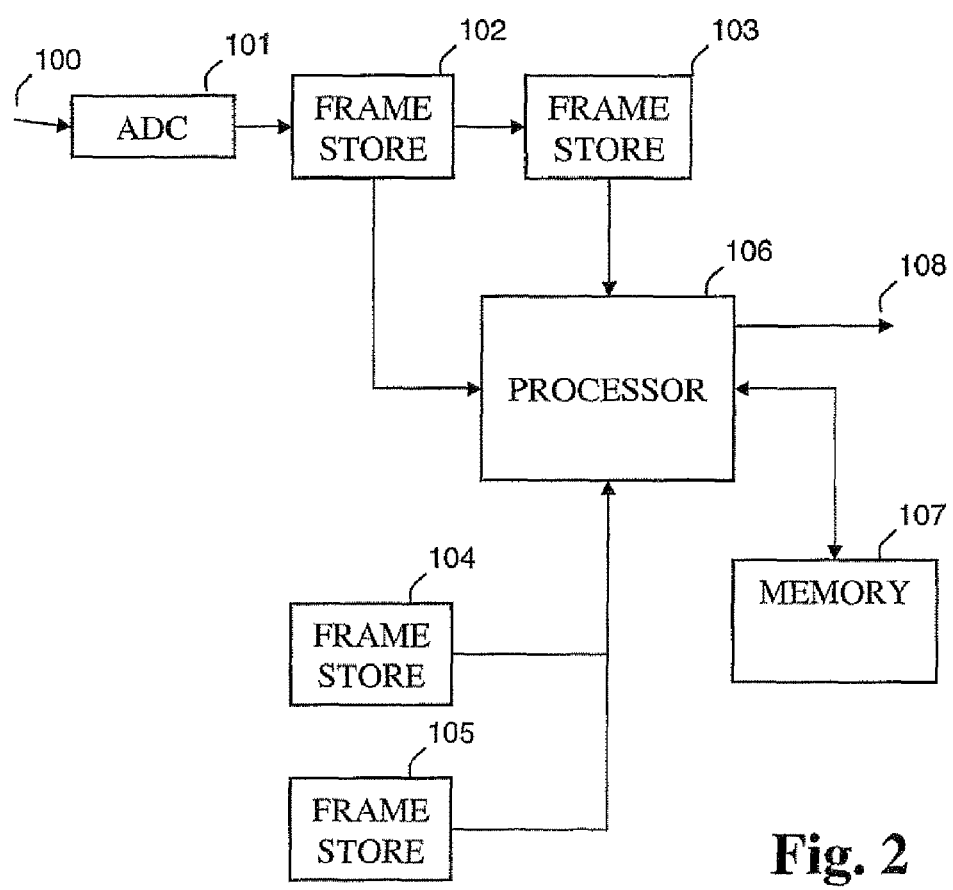
FIG. 2 is diagram showing a detection system which may inmplement the steps illustrated in FIGS. 3 or 4.

In the detection system shown in FIG. 2 an analogue video input signal (perhaps from the satellite decoder of FIG. 1) arrives via an input 100 at an analogue to digital converter 101. As each successive video frame is received it is stored in a frame store 102. In the alternative, frames already in digital form could be fed directly to the frame store 102, or a compressed digital input could be fed to it via a suitable decoder.

The frame store 102 stores the most recently received frame—the "current frame". A second frame store 103 stores an earlier frame—usually the one immediately preceding the one stored in the store 102. It is assumed that, as a fresh frame is loaded into the store 102, the existing frame in the store 102 is transferred to the store 103; it is shown this way for clarity—in practice it would be preferable to write frames alternately into two stores, and maintain address pointers to track which frame was in which store.

The apparatus also contains one or more further frame stores (two, 104, 105 being shown) each containing a still frame. These do not change and could be implemented as read-only memories. A processor 106 has access to the contents of all the frame stores, and to memory 107 which includes programs for control of the processor, and general purpose memory. Results appear at an output 108. This architecture accommodates several versions of the invention—not all versions require both the frame store 103 and the frame stores 104, 105.

The function of the apparatus is the detection of the loss of audiovisual signal containing real content by digital processing of the video (and, optionally, audio) components of the audiovisual signal. Here "real content" is used to distinguish content as intended by the content producer from an audiovisual signal that is different from that intended—for example a continuously repeated picture from a crashed satellite decoder. In both cases the analogue video signal may be valid, and hence analogue consideration of the signal, as in the prior art, is not useful.

Figure 3:
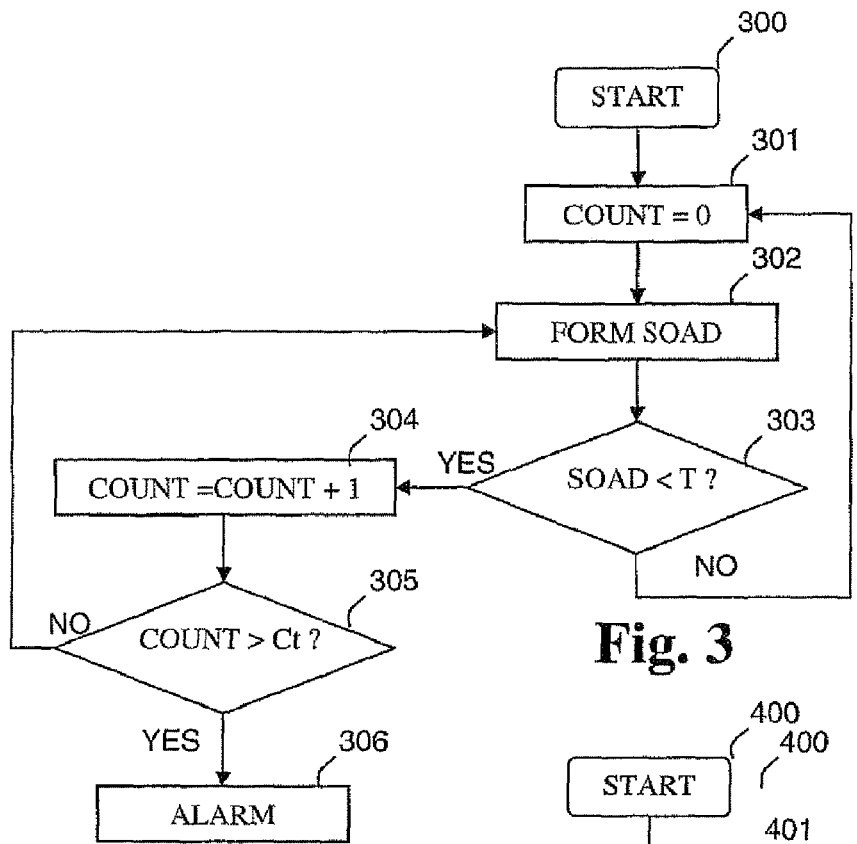
FIG. 3 is a flowchart showing steps in accordance with a first example embodiment of the present invention.

In a first embodiment of the invention, the program stored in the memory 107 operates according to the flowchart of FIG. 3.

This involves the processor 106 comparing the received video signal against one or more template pictures with and without motion compensation, and when the difference between the received video signal and one or more of the processed template pictures is less than a threshold, detecting the loss of audiovisual signal containing real content. The rationale for this is that certain types of satellite receiver/decoder usually output a fixed picture indicating an error condition when it crashes and when the desired content is not being received. The flowchart of FIG. 3 assumes that one such error message picture is stored in the frame store 104. The process commences at Step 300:

In step 301 a Count is set to zero;

Step 302 the frame in the frame store 102 is compared with that stored in the frame store 104, by forming a measure of the difference between the two frames. In this example, the sum of absolute differences is used, though other measures (such as the sum of squared differences) could be used instead.

In Step 303 it is checked whether this measure is less than a threshold value. If a frame has n×m picture elements and the luminance of each is in the range 1 to 255 then the maximum possible SOAD is 255 n×m. A suitable threshold value would be between 3 n×m and 10 n×m.

A simple implementation of the invention might generate an alarm as soon as the SOAD falls below the threshold, thereby indicating that the received frame is nearly identical to the error picture, but in the version shown the alarm is generated only if this condition persists for a set number of frames—perhaps 5 or 10. Thus, if the test of step 303 gives a "yes" result, then the Count is incremented at 304, and the next frame tested at 302. Only if it is recognised (at 305) that the count exceeds a threshold count $C_t$ is the alarm generated 306. If the SOAD does not fall below the threshold, then the count is again reset at 301 and the process is repeated for the next frame. If desired, the resetting of the counter could be performed only if two (or more) consecutive frames exceed the threshold.

Another, optional, modification of this method is the introduction of motion compensation. Of course, there is no question of the error picture actually being a moving picture; rather, we wish to avoid the possibility of failure to recognise the error picture if the image registration varies as between the received frame and the stored frame. This could occur, for example, owing to variations in the synchronisation timing of the analogue-to digital converter. Thus one might compute (using conventional techniques) a global motion vector for the two frames, and shift one of them by this amount before forming the SOAD. Note that, if motion compensation is not used, a threshold value towards the upper end of the range quoted above would be appropriate. The same effect could be achieved by calculating at step 302 the SOAD not only for the two frames as they stand, but also for the two frames with a variety of shifts x,y where x and y might range from 0 to 3 pixels, i.e. 15 shifts and 16 SOAD values in total. The test at 303 would be deemed to be passed if any of the SOADs were less than the threshold. In the event that there are two Error pictures that might be generated, they would be stored in the stores 104, 105, the process of FIG. 3 would be performed for both, and an alarm generated if either process indicated an alarm condition.

A fast method of calculating global motion vectors which might be used is described in our co-pending European patent application 05251527.7 of 14 Mar. 2005.

A second embodiment of the invention involves measuring the correlation between successive overlapping pairs of pictures of the received video signal with and without motion compensation, determining whether the difference for each pair is less than a threshold, and when a given number of consecutive pairs of pictures with differences below the threshold is identified, detecting the loss of audiovisual signal containing real content. This can be useful as some devices will output a still picture in the case of an error condition, with this picture being the most recently received and decoded picture from the content.

The operation of this version is as described with reference to FIG. 3, except that the current frame is now compared not with the fixed frame in the frame store 102 but with the previous frame in the store 103. A typical threshold value might be 0.5 n×m.

As before, motion compensation might be included. Care must be taken to avoid false detection as some content does contain still pictures for a significant length of time, such as information pages shown in horse racing content. This may be accommodated by choosing a sufficiently large number of frames for the count threshold, say 250 or more, and/or making the generation of an alarm conditional also on the passing of some other test, such as the loss of an accompanying audio signal for a predetermined period. Indeed, this additional test might be applied to other versions of the invention also.

In a third version of the invention, we measure the correlation between successive overlapping pairs of pictures of the received video signal, determining whether the difference for each pair is more than a threshold, and when a given number of consecutive pairs of pictures with differences above the threshold is identified, detecting the loss of audiovisual signal containing real content. Some devices will output white-noise-like pictures in the case of an error condition; false detection is less of a problem here as real content will not have each picture uncorrelated with the previous for more than a few consecutive pictures at most.

Figure 4:
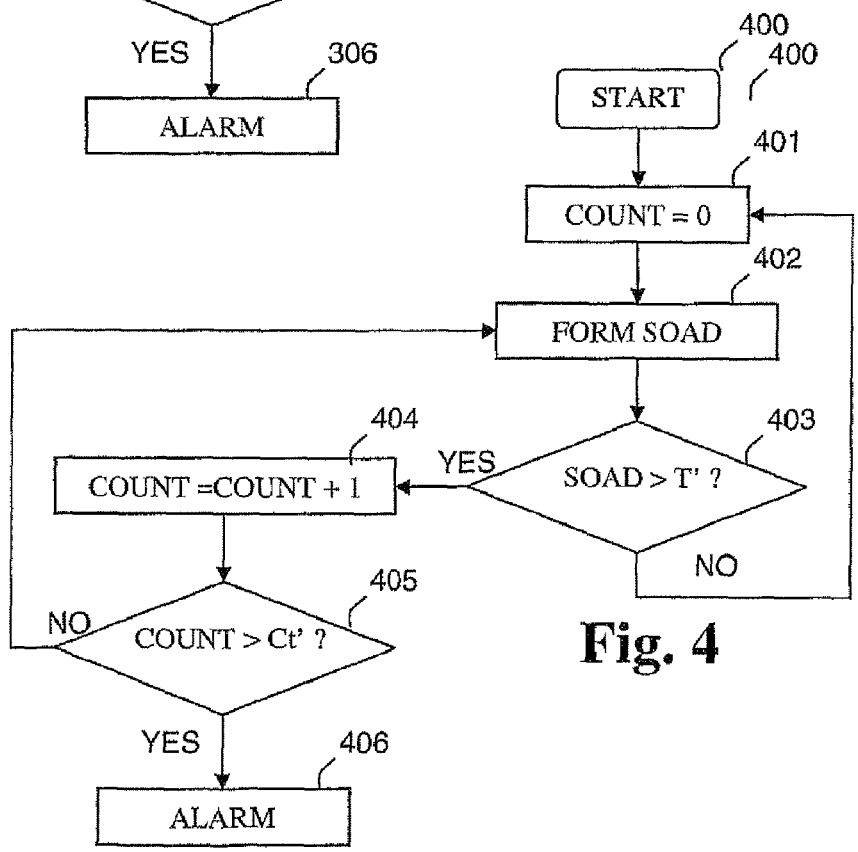
FIG. 4 is a flowchart showing steps in accordance with a second example embodiment of the present invention.

Thus, in FIG. 4, operation is as in FIG. 3, except that the test is whether the SOAD exceeds a threshold value T'. It can be shown that, where two pictures are simply white noise, so that every picture element has a random value, then the average absolute difference is about ⅓ of the maximum value. [In actual fact this is true only for a continuous variable: for N+1 levels (0 . . . N) it is (N+2)/3(N+1), which is asymptotic to ⅓ and for N=255 is 0.3346] So for a luminance range of 0 to 255 the average uncorrelated difference is 85.33 and hence the SOAD summed over the whole picture in such a case would be about 85 n×m. However, experiments suggest that noise patterns encountered in practice may (possibly owing to the use of transform coding or other digital processing techniques) not have completely uniform probability distributions and in such a situation a smaller value, perhaps as low as 20 n×m may be preferable. The count threshold would typically be 5 frames. Again, motion compensation may be performed, to avoid the threshold being exceeded by scenes with rapid motion.

Figure 5:
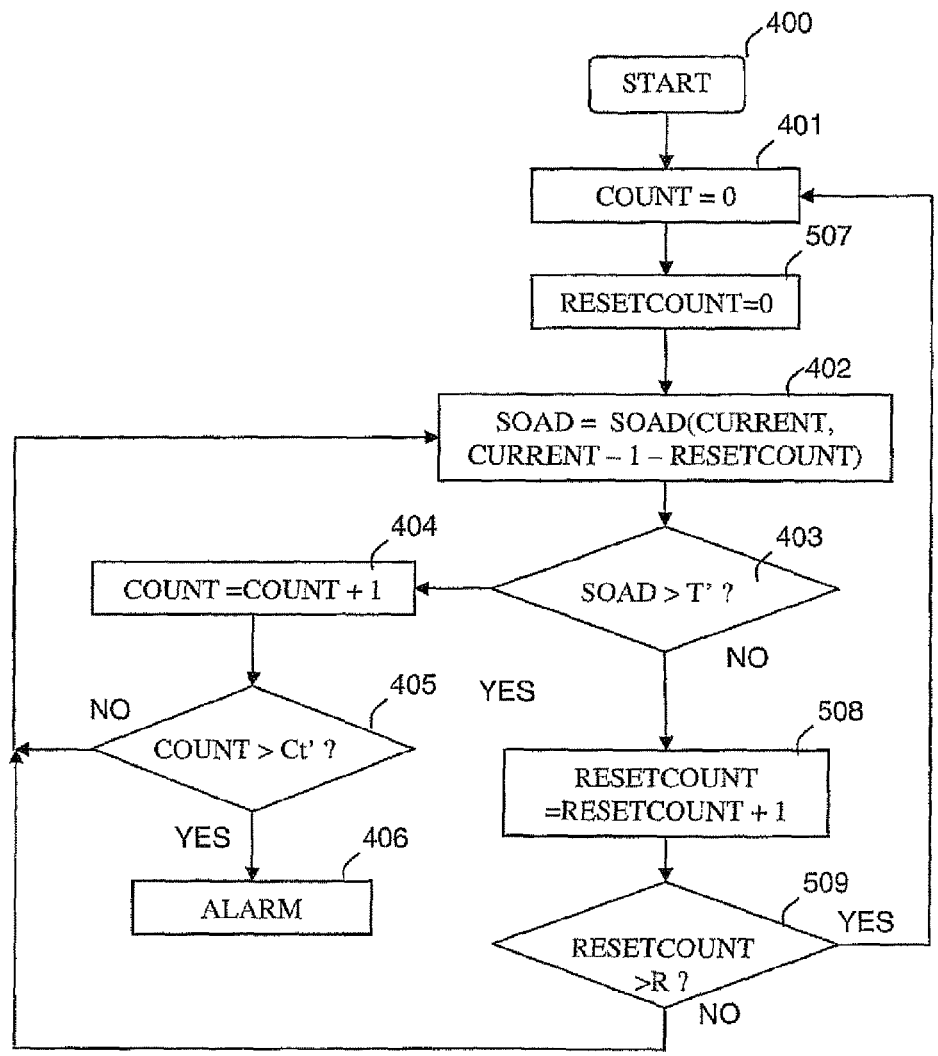
FIG. 5 is flowchart showing steps in accordance with a modified version of the embodiment of FIG. 4.

FIG. 5 is a modified version of the scheme of FIG. 4: note, however that these modifications may be applied to the other embodiments of the invention too. Here, the count is to be reset only if a plurality R of consecutive frames fails the test at 403. Thus, initially a reset count is set to zero at 507. When the test is failed at 403 then the reset count is incremented at 508. Then if the reset count exceeds R control passes to 401 and both counts reinitialised; otherwise the next frame is evaluated at 402.

A second difference from FIG. 4 is that, whilst normally the sum of absolute difference computed at 402 is that between the current frame and its predecessor, if the test at 403 has failed but the count not reset, then (where R=1) the current frame is compared not with its predecessor but with its predecessor's predecessor. For other values of R then the comparison is with the last frame not to have failed the test (i.e. is earlier than the preceding frame by a number of frames equal to the reset count).

In an alternative approach, fault detection by recognising highly correlated (still) pictures or highly uncorrelated pictures (noise) can be accomplished, in cases where the signal has already been encoded using a compression algorithm such as MPEG or H.264, by measuring characteristics of the bitstream produced by the encoder. Such characteristics include the average quantisation step size used, and the average number of bits per picture generated. Repeated still pictures can be detected by the average quantisation step size becoming small, and/or by the average number of bits per picture becoming small, as the encoder cannot generate enough bits to satisfy the requirements of a constant bit rate channel. As white noise cannot be compressed, in that case the average quantisation step size would become very large, as would the average number of bits per picture, and pictures would need to be dropped (i.e. not coded/represented in the compressed bitstream). The benefit of this type of technique is that only minimal processing beyond that required for normal video encoding is required to perform detection of the loss of audiovisual signal containing real content.

A convenient way of implementing this is to make use of the picture complexity index C, which is equal to the product of the average quantiser step size for the frame under consideration and the number of coded bits generated for the frame. The method would be implemented as in FIG. 3 (or 4) except that the calculation 302 (402) is replaced by the calculation $$C = B_i Q_i$$

where $B_i$ is the number of bits used to code frame i and $Q_i$ is the average quantiser step size used to code frame i. Then the comparison 303 is replaced by the comparison "C<T?". In tests, a slow-moving QCIF (176×144 pixels) produced complexity values of around 7000, so a sequence for which the complexity C falls below a threshold T of about this value would be deemed to constitute a "frozen" sequence. This value is proportional to the image area—i.e. a typical threshold value for the general case would be 0.28 n×m. In the case of the upper threshold at 403 in FIG. 4, the test becomes "C>T ?": A threshold of 200,000 or 7.9 n×m would be appropriate. As before, both tests could be applied, so that an alarm is produced whenever the complexity index (or the stepsize or the average number of bits per picture) falls below the lower threshold, and whenever it exceeds the upper threshold.

It is conventional to sum the complexity C over a number of frames; this may be done if desired, but is not essential. Note that other measures that increase monotonically with step size and with number of coded bits could be used instead. In particular, rather than using the average step size, one could proceed by taking each area that has a particular step size and multiplying this by the number of coded bits, and summing the products; but as the complexity index is in any event only an approximate measure of the true complexity, this more rigorous approach offers no real advantage.

In the case of coded signals according to the H.264 standard, a difficulty arises in that the quantiser step sizes are conveyed to the receiver by sending, for each macroblock, a "quantiser index", which the receiver translates in to actual step sizes, but a given quantiser index represents different step sizes for different coefficients. Although it would be possible to adopt a rigorous approach and compute the $B_i Q_i$ product separately for each coefficient, again this is not justified in practice and therefore we prefer to proceed by translating the H.264 quantiser index into a single representative quantiser step size which is then used as described above. Our formula for the step size in terms of the quantiser index $Q_P$ is $$Q = 3 \times 2^{\frac{Q_P - 24}{6}}$$

The important parameter here is the 6, reflecting the fact that the stepsize is related to the quantiser index by an exponential function such that for a change in index of 6, the step size doubles or halves. The values 3 and 24 are arbitrary since the use of different values simply scales the result and therefore (with appropriate choice of threshold value) does not change the final result.

In practice, we prefer, rather than translating the quantiser indexes into step sizes and then averaging the step sizes, firstly to average the quantiser indexes and then translate the result into a quantiser step size for the frame. As the index is a logarithmic representation of the step size this means that one is using the geometric mean of the step size, rather than the arithmetic mean.

If a more accurate approach is desired (for example because the index varies a great deal over a single frame, a possible alternative would be to compute the product of bits and step size for each macroblock, and sum them over the frame. In this case a simple integer table lookup could be used for mapping the index to step size.

What is claimed is:

1. A method of detecting faults in a video signal, comprising:
   receiving and storing a video signal;
   comparing frames of the video signal each with its predecessor;
   incrementing a first counter in the event that the difference between the frames falls below a first threshold;
   incrementing a second counter in the event that the difference between the frames exceeds a second threshold, higher than the first threshold;
   generating an alarm signal indicative of a fault in the video signal in the event that the count of the first counter exceeds a first predetermined count; and
   generating an alarm signal indicative of a fault in the video, signal in the event that the count of the second counter exceeds a second predetermined count.

2. A method according to claim 1 including resetting the first counter in the event that the difference between the frames fails to fall below the first threshold for a predetermined number of frames.

3. A method according to claim 2 in which the predetermined number of frames is 1.

4. A method according to claim 1 including resetting the second counter in the event that the difference between the frames fails to exceed the second threshold for a predetermined number of frames.

5. A method according to claim 4 in which the predetermined number of frames is 1.

6. A method according to claim 2 in which the predetermined number of frames is greater than one and, in the event of receipt of a frame whose difference does not fall below the first threshold when the first counter is nonzero but nevertheless not re-set, comparing the next frame not with its predecessor but with the most recent frame whose difference did fall below the threshold.

7. A method according to claim 1 including applying global motion compensation prior to making the comparison.

8. A method according to claim 1 including monitoring an accompanying audio signal and wherein the generation of said alarm is conditional also upon failure of the accompanying audio signal for a set period.

9. A method of detecting white noise in a video signal, comprising:
   receiving and storing a video signal;
   comparing frames of the video signal each with its predecessor;
   incrementing a counter in the event that the difference between the frames exceeds a threshold, said threshold having a value equal to at least 8% of the maximum difference between frames;
   and generating an alarm signal indicative of white noise in the video signal in the event that the count of the counter exceeds a predetermined count.

10. A method according to claim 9 including resetting the counter in the event that the difference between the frames fails to exceed the threshold for a predetermined number of frames.

11. A method according to claim 10 in which the predetermined number of frames is 1.

12. A method according to claim 10 in which the predetermined number of frames is greater than one and, in the event of receipt of a frame whose difference does not exceed the threshold when the counter is nonzero but is nevertheless not reset, comparing the next frame not with its predecessor but with the most recent frame whose difference did exceed the threshold.

13. A method of detecting faults in a video signal, comprising:
   storing at least one template picture;
   comparing each frame of the video signal at least one template picture;

incrementing a counter in the event that the difference between the frame and the template picture falls below a threshold; and generating an alarm signal indicative of a fault in the video signal in the event that the count of the counter exceeds a predetermined count.

14. A method of detecting faults in a video signal, comprising:

receiving and storing a video signal;

comparing frames of the video signal each with its predecessor;

incrementing a counter in the event that the difference between the frames meets a preset criterion; and generating an alarm signal indicative of a fault in the video signal in the event that the count of the counter exceeds a predetermined count, wherein, in the event of receipt of a frame whose difference does meet the criterion when the counter is greater than one and not reset, comparing the next frame not with its predecessor but with the most recent frame whose difference did not meet said preset criterion.

15. A method according to claim 14 including resetting the counter in the event that the difference between the frames fails to meet said preset criterion for a predetermined number of frames greater than one.

* * * * *